(12) United States Patent
Mills et al.

(10) Patent No.: US 9,394,799 B1
(45) Date of Patent: Jul. 19, 2016

(54) AIR RIDING SEAL FOR A TURBINE

(71) Applicants: Jacob A Mills, Jupiter, FL (US); Wesley D Brown, Jupiter, FL (US); Thomas D Sexton, Tequesta, FL (US); Russell B Jones, North Palm Beach, FL (US)

(72) Inventors: Jacob A Mills, Jupiter, FL (US); Wesley D Brown, Jupiter, FL (US); Thomas D Sexton, Tequesta, FL (US); Russell B Jones, North Palm Beach, FL (US)

(73) Assignee: S & J DESIGN LLC, Jupiter, FL (US)

( * ) Notice: Subject to any disclaimer, the term of this patent is extended or adjusted under 35 U.S.C. 154(b) by 0 days.

(21) Appl. No.: 14/795,095

(22) Filed: Jul. 9, 2015

Related U.S. Application Data

(60) Provisional application No. 62/022,358, filed on Jul. 9, 2014.

(51) Int. Cl.
*F16J 15/34* (2006.01)
*F01D 11/02* (2006.01)

(52) U.S. Cl.
CPC .............. *F01D 11/025* (2013.01); *F16J 15/34* (2013.01)

(58) Field of Classification Search
CPC ....... F16J 15/34; F16J 15/3416; F16J 15/342; F16J 15/3436; F16J 15/3452; F16J 15/346; F16J 15/40; F16J 15/42; F01D 11/025
See application file for complete search history.

(56) References Cited

U.S. PATENT DOCUMENTS

| | | | | |
|---|---|---|---|---|
| 4,961,678 | A * | 10/1990 | Janocko | F16J 15/342 277/401 |
| 5,193,974 | A * | 3/1993 | Hufford | F04D 1/12 277/401 |
| 7,823,885 | B2 * | 11/2010 | Droscher | F16J 15/3484 277/369 |
| 7,862,046 | B2 * | 1/2011 | Lederer | F16J 15/342 277/348 |
| 8,215,645 | B1 * | 7/2012 | Aho, Jr. | F16J 15/342 277/370 |
| 2013/0147123 | A1 * | 6/2013 | Davies | F02C 7/28 277/348 |
| 2014/0159317 | A1 * | 6/2014 | Jahn | F16J 15/3468 277/411 |

* cited by examiner

*Primary Examiner* — Gilbert Lee
(74) *Attorney, Agent, or Firm* — John Ryznic

(57) ABSTRACT

An air riding seal between a rotor and a stator in a turbine of a gas turbine engine, where an annular piston is movable in an axial direction within a housing that extends from the stator, and a bellows is secured to the annular piston to form a flexible air passageway from a compressed air inlet through the annular piston and into a cushion cavity that forms an air riding seal between the annular piston and the rotor sealing surface. In another embodiment, a flexible seal secured to and extending from the annular piston forms a sealing surface between the annular piston chamber and the annular piston to provide a seal and allow for axial movement.

14 Claims, 4 Drawing Sheets

AIR RIDING SEAL FOR A TURBINE

CROSS-REFERENCE TO RELATED APPLICATIONS

This application claims the benefit to U.S. Provisional Application 62/022,358 filed on Jul. 9, 2014 and entitled AIR RIDING SEAL FOR A TURBINE.

GOVERNMENT LICENSE RIGHTS

This invention was made with Government support under contract number DE-SC0008218 awarded by Department of Energy. The Government has certain rights in the invention.

BACKGROUND OF THE INVENTION

1. Field of the Invention

The present invention relates generally to a gas turbine engine, and more specifically to an air riding seal between a rotor and a stator in a turbine.

2. Description of the Related Art Including Information Disclosed Under 37 CFR 1.97 and 1.98

Air riding seals are designed to provide non-contacting sealing between a rotating part and a stationary part, usually within a gas turbine engine. This is done by providing a high pressure supply of fluid to an annular piston that is free to slide axially. The fluid flow is routed to the face between the rotating static components via an orifice creating an annulus of high pressure that keeps the seal piston from contacting the face of the rotating body. The high pressure fluid is allowed to leak out of the cavity radially inward and outward in small quantities in order to regulate a gap between the rotating and the static components. These seals are highly effective at limiting leakage when compared to other more traditional alternatives such as a labyrinth seal or a brush seal.

Because air riding seals rely on the high pressure supply fluid to operate, secondary seals are required to ensure minimal leakage out of the high pressure cavity. The secondary seals need to be able to accommodate the axial sliding that occurs as the piston "follows" the axial motion of the rotor during operation. In common practice, these seals are piston type C-seals or ring seals. These secondary seals provide decent sealing but they still allow some leakage, thus lowering the effectiveness of the entire seal package. An additional feature, such as a spring, is also commonly used to pull the piston off of the rotor face during transient shutdown and startup conditions so as to minimize static to rotating rubbing.

BRIEF SUMMARY OF THE INVENTION

An air riding seal that utilizes a bellows type static seal to ensure a virtually leak free high pressure cavity. Two bellows seals are used that include an inner seal and an outer seal that seals the high pressure cavity from the adjacent lower pressure cavity. It is desirable that the bellows seals exhibit a low axial stiffness so that the seal is not impeded from sliding axially. As a result, the bellows seals are composed of a thin material such as sheet metal in order to achieve a low axial stiffness. Because this construction might be too weak to withstand high pressure differentials without aid, backup walls are present to provide the required radial strength.

The bellows will provide some axial spring force to the sealing piston. It is desirable to design the bellows so that this spring force works to move the piston away from the rotor. This is done so as to reduce the possibility of a static-to-rotating rub in transient shutdown and startup conditions. This feature would normally need to be incorporated into a separate feature if other secondary sealing methods are used. Because the bellows seals perform both functions, the design has a lower weight and complexity than a similarly featured design with conventional secondary seals.

DETAILED DESCRIPTION OF THE INVENTION

Figure 1:
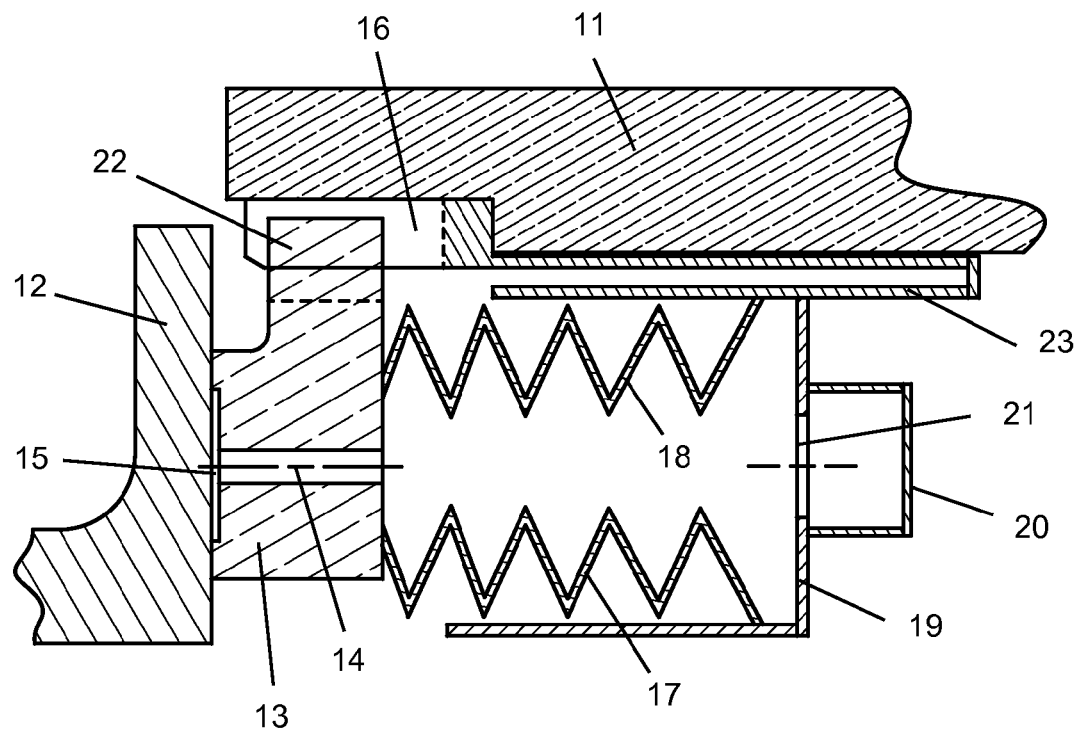
FIG. 1 shows a first embodiment of an air riding seal with an inner and outer bellows of the present invention.

The present invention is an air riding seal formed between a rotor and a stator such as that found in a turbine of a gas turbine engine. A floating air seal for a turbo machine is described in U.S. Pat. No. 8,215,645 issued to Wilho Aho, J R on Jul. 10, 2012 and entitled FLOATING AIR SEAL FOR A TURBO MACHINE, which is incorporated herein by reference. FIG. 1 shows a first embodiment (in the present invention) of an air riding seal formed between a stator 11 and a rotor 12. An annular piston 13 has a cavity 15 on the sealing side that is supplied with a fluid such as compressed air through one or more axial supply passages 14. A cushion of air is formed between the annular piston 13 and the surface of the rotor 12 to form a seal across the annular piston 13. An annular inner bellows 17 and an annular outer bellows 18 forms a space for compressed air to enter from a scoop 20 that supplied the compressed air to the cavity 15 of the annular piston 13. An annular bellows housing 19 supports and allows for axial displacement of the two bellows 17 and 18. A rotor adjacent to the scoop 20 causes the air to swirl around the scoop 20, which then scoops up the compressed air to pass into the space formed between the two bellows 17 and 18 through one or more openings 21. The two bellows are so shaped to allow for axial displacement of the annular piston 13. One or more radial alignment slots 16 are formed in the stator 11 that align with an equal number of projections 22 from the annular piston 13 to prevent rotation of the annular piston 13 while allowing for axial displacement of the annular piston 13. The bellows assembly is secured to a flexible support 23 that is attached to the stator 11.

Figure 2:
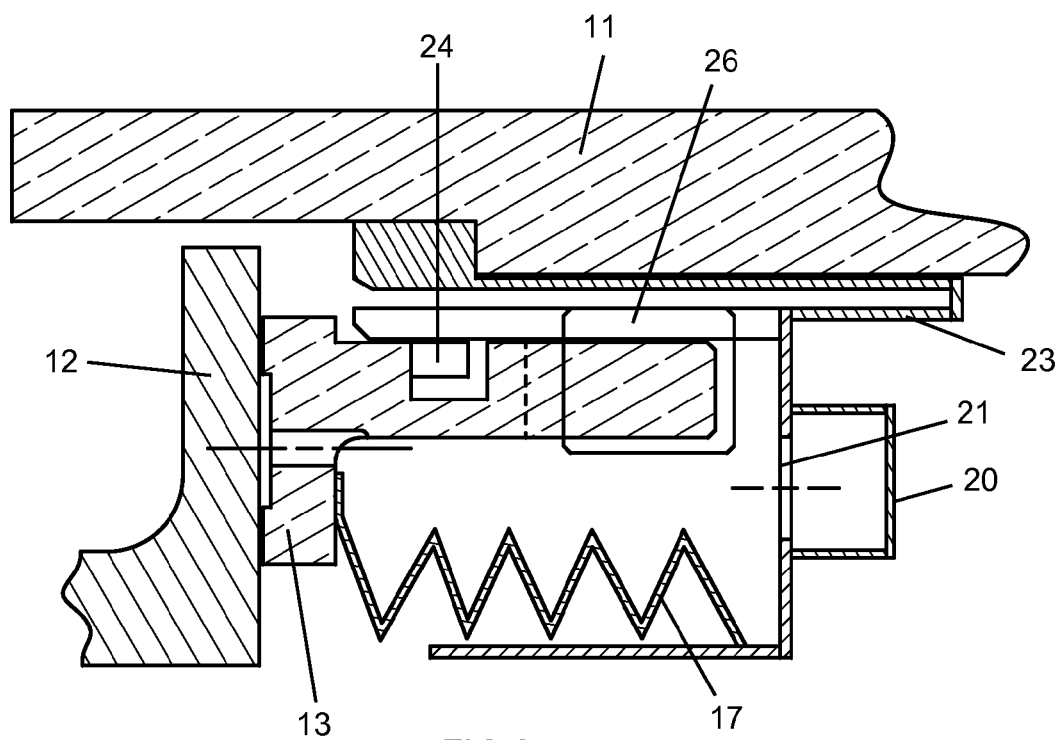
FIG. 2 shows a second embodiment of the air riding seal with only an inner bellows of the present invention.

FIG. 2 shows a second embodiment of the air riding seal in which only one bellows seal 17 is used to seal only one of the leakage paths while a second piston type seal is used to seal the other leakage path. This design carries the benefit of providing the bellows spring restorative force and secondary sealing while also incorporating a second conventional secondary seal. This type of design would be ideal for a high vibration environment where high cycle fatigue (HCF) on the bellows is a concern. Because only the bellows is used, it can be made stiffer than the equivalent two bellows system of FIG. 1, and achieve the same desired spring rate. The stiffer bellows would be less likely to fail due to HCF.

The FIG. 2 embodiment includes a piston seal ring 24 is an annular groove formed on an outer surface of the annular piston 13 that engages with an inner surface of an extension of the flexible support 23. One or more radial alignment slots 26 are used to prevent rotation of the bellows seal assembly.

Figure 3:
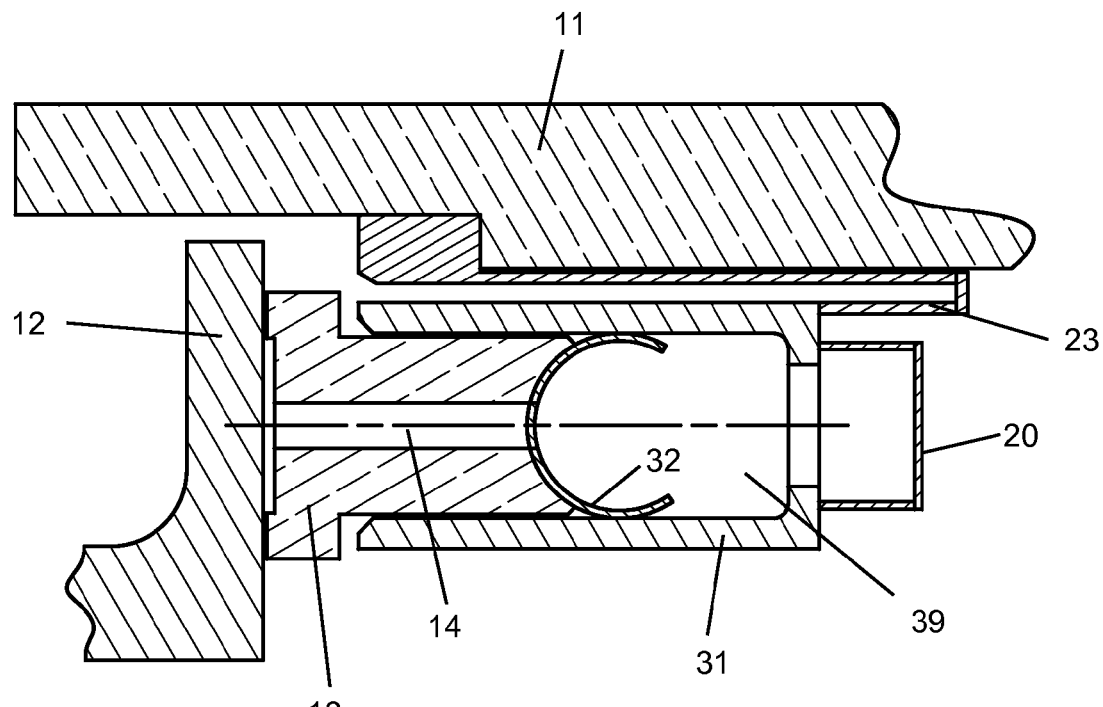
FIG. 3 shows a third embodiment of the air riding seal with a C-seal of the present invention.
Figure 4:
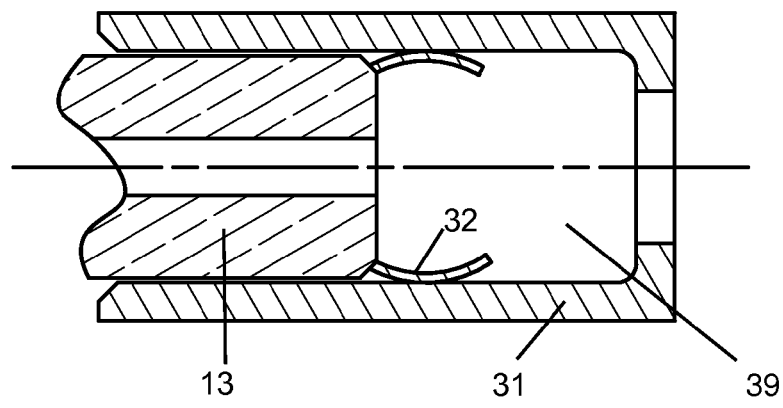
FIG. 4 shows another version of the C-seal used in the air riding seal of the present invention.

In another embodiment of the air riding seal, a single C-shaped crush seal is used to seal an aft end of the sealing piston 13. FIG. 3 shows this embodiment. The integral C-seal 32 would be pressed into an annular cavity 39 of an annular piston housing 31, thus deforming the two prongs of the seal 32. The annular piston 13 moves in an axial direction within the annular cavity 29 of the annular piston housing 31. The spring back load would cause the two surfaces of the C-shaped seal 32 (C-seal) to push against inner surfaces of the housing 31 and create two sealing surfaces. The C-seal would be fixed into the annular piston 13 as shown in FIG. 3 and FIG. 4 by welding, brazing, or other joining methods. The advantage of this design lies in the reduced overall seal complexity and reduction in sealing surfaces.

Figure 5:
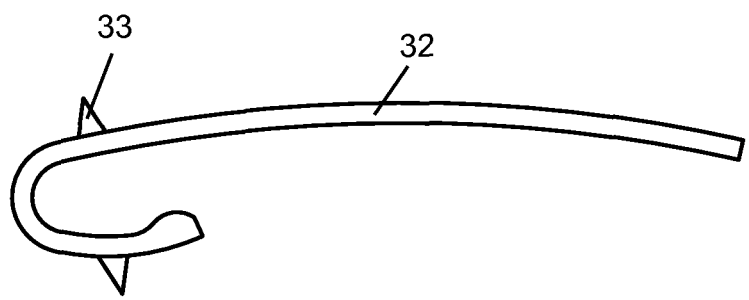
FIG. 5 shows a side view of a method of securing the C-seal to the annular piston using a spike of the present invention.
Figure 6:
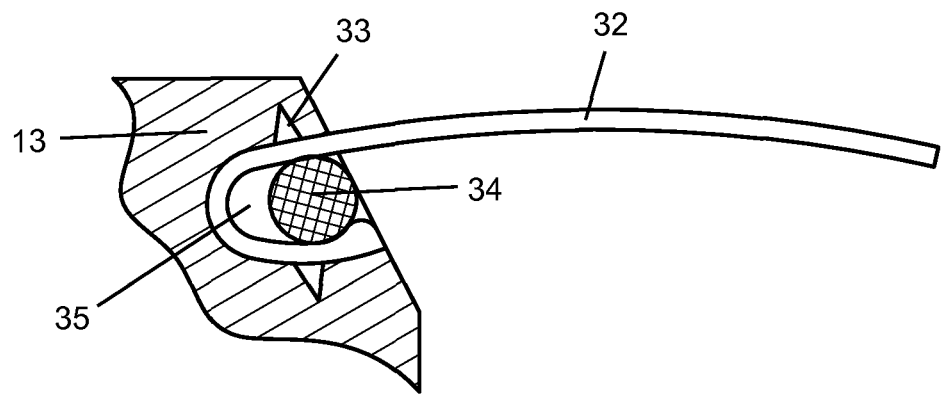
FIG. 6 shows a side view of a method of securing the C-seal to the annular piston using a spike and a pin of the present invention.
Figure 7:
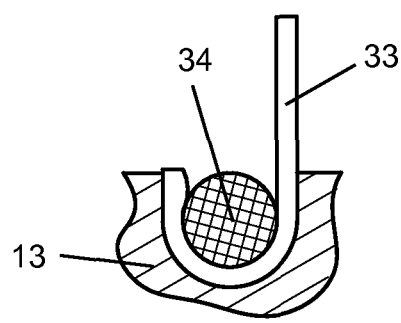
FIG. 7 shows a side view of a method of securing the C-seal to the annular piston using only a pin of the present invention.

FIGS. 5, 6 and 7 show other embodiments of attaching a C-shaped seal 32 to the aft end of the annular piston 13. FIG. 5 shows the C-shaped seal 32 with a spike 33 that is used to engage a surface of the annular piston 13. FIG. 6 shows a pin 34 used to secure the C-seal within a slot 35 of the annular piston 13. FIG. 7 shows just the pin 34 without a spike 33.

Figure 9:
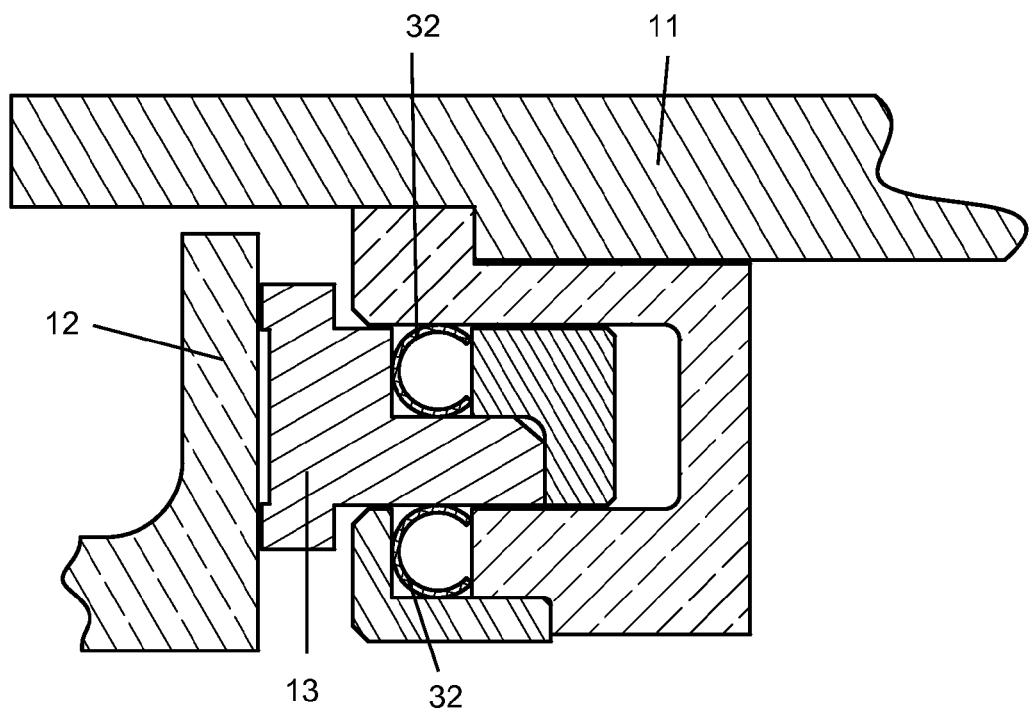
FIG. 9 shows a side view of an embodiment of the air riding seal with dual C-seals of the present invention.

FIG. 9 shows a representation of a dual C-seal design that includes two C-seals 32 used to seal the high pressure cavity from the surrounding lower pressure cavities. Because C-seals 32 cannot be stretched radially or split at one location and still seal properly, they need two part assemblies in order to be installed properly. This increases the part count for a given seal design, thus increasing cost, complexity, and often weight. The designs shown in FIGS. 3 and 4 utilize the C-seal sealing method without requiring extra components for assembly.

Figure 8:
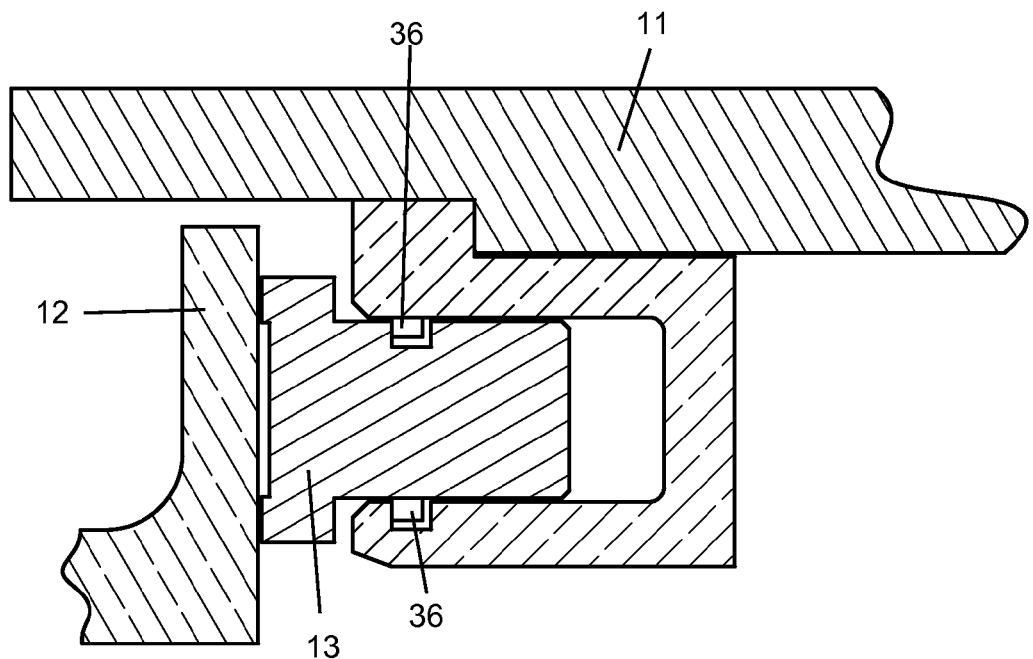
FIG. 8 shows a side view of an embodiment of the air riding seal with dual ring seals of the present invention.

FIGS. 8 and 9 show that either a dual ring seal 36 or dual C-seal 32 design would have four total secondary leak paths. On the C-seals, these leak paths are on the outer and inner surfaces of each seal. On each ring seal, one leak path is on a cylindrical face and the other is on an axial face. The present invention only has two leak paths, thus limiting the overall leakage to be lower than either of the other two alternatives.

We claim the following:

1. A gas turbine engine comprising:
    a turbine with a rotor and a stator;
    an annular piston with a sealing cavity formed on a rotor side;
    the rotor having a sealing surface opposite to the sealing cavity on the annular piston;
    an annular bellows housing extending from the stator;
    an annular inner bellows secured to the annular piston and axially moveable within the bellows housing;
    an air scoop on the bellows housing;
    the annular piston having an axial passage; and,
    rotation of the air scoop forces air into a chamber formed within the bellows housing and through the axial passage and into the cushion chamber to form an air riding seal between the rotor and the stator.

2. The gas turbine engine of claim 1, and further comprising:
    an annular outer bellows secured to the annular piston and axial moveable within the bellows housing;
    the annular inner bellows and the annular outer bellows forming the air passage between the scoop and the axial passage within the annular piston.

3. The gas turbine engine of claim 1, and further comprising:
    the stator includes a radial alignment slot facing the annular piston; and,
    the annular piston includes a radial projection axial slidable within the radial alignment slot to prevent rotation of the annular piston within the stator.

4. The gas turbine engine of claim 1, and further comprising:
    the bellows housing extends from a flexible support that extends from the stator.

5. The gas turbine engine of claim 1, and further comprising:
    the bellows housing includes a plurality of scoops arranged in an annular arrangement.

6. A gas turbine engine comprising:
    a turbine with a rotor and a stator;
    an annular piston housing extending from the stator;
    an annular cavity formed within the annular piston housing;
    an annular piston movable in an axial direction within the annular cavity;
    an air scoop extending from the annular cavity;
    the annular piston having an axial passage opening on one end into the annular cavity and opening on an opposite end into a cushion cavity;
    an air riding seal formed between a sealing surface on the rotor and the cushion cavity of the annular piston; and,
    a flexible seal extending from an end of the annular piston and forming a sealing surface between the annular piston and the annular cavity.

7. The gas turbine engine of claim 6, and further comprising:
    the flexible seal is a C-shaped seal.

8. The gas turbine engine of claim 7, and further comprising:
    the C-shaped seal is formed by an upper section extending from the annular piston and a lower section extending from the annular piston.

9. The gas turbine engine of claim 8, and further comprising:
    each C-shaped seal section is secured within a slot of the annular piston by a pin.

10. The gas turbine engine of claim 9, and further comprising:
    each C-shaped seal section includes a spike extending from the C-shaped seal within the slot.

11. A gas turbine engine comprising:
    a turbine with a rotor and a stator;
    the rotor having an air riding sealing surface;
    an annular piston housing extending from the rotor and forming an annular piston chamber;
    an annular piston axially moveable within the annular piston chamber;
    the annular piston having an axial passage that opens on one end into the annular piston chamber and opens on an opposite end into a cushion chamber formed on that end of the annular piston;
    an inner annular seal and an outer annular seal forming a seal between the annular piston and the annular piston chamber that forms a seal between the annular piston and the annular piston chamber thru axial movement of the annular piston; and, compressed air is passed thru the axial passage and into the cushion chamber to form an air riding seal between the rotor sealing surface and the annular piston.

12. The gas turbine engine of claim 11, and further comprising:
    the inner annular seal and the outer annular seal are both C-shaped flexible seals extending from the annular piston.

13. The gas turbine engine of claim 12, and further comprising:
    the outer annular seal is an annular flexible seal secured within an annular slot formed by the annular piston; and,
    the inner annular seal is an annular flexible seal secured within an annular slot formed by the annular piston housing.

14. The gas turbine engine of claim 11, and further comprising:
    the inner annular seal and the outer annular seal are both annular ring seals each secured within an annular seal slot.

* * * * *